United States Patent [19]

Nagao et al.

[11] Patent Number: 4,928,473
[45] Date of Patent: May 29, 1990

[54] DEVICE FOR AUTOMATICALLY FILLING AND PACKING PREDETERMINED WEIGHT OF PRODUCT IN CONTAINERS

[75] Inventors: Takeyoshi Nagao, Kakogawa; Toru Kohashi, Hyogo, both of Japan

[73] Assignee: Yamato Scale Company, Limited, Akashi, Japan

[21] Appl. No.: 364,259

[22] Filed: Jun. 9, 1989

[30] Foreign Application Priority Data

Jun. 20, 1988 [JP] Japan .................................. 63-153058

[51] Int. Cl.⁵ .................. B65B 57/02; G01G 15/00
[52] U.S. Cl. .......................................... 53/53; 53/502; 177/58
[58] Field of Search ............... 53/53, 55, 502, 571, 53/570, 272; 177/54, 58, 52, 3, 6

[56] References Cited

U.S. PATENT DOCUMENTS

| | | | |
|---|---|---|---|
| 200,342 | 2/1878 | Relph | 177/58 X |
| 2,031,708 | 2/1936 | Hannewald et al. | 177/58 |
| 2,158,023 | 5/1939 | Smith | 177/58 X |
| 3,498,020 | 3/1970 | Eppenberger | 53/502 X |
| 3,982,376 | 9/1976 | Ikeda | 53/53 |
| 4,230,195 | 10/1980 | Graffin | 177/58 X |

FOREIGN PATENT DOCUMENTS 1013130 12/1965 United Kingdom ............ 177/58
2195779A 4/1988 United Kingdom ............ 13/24

*Primary Examiner*—James F. Coan
*Attorney, Agent, or Firm*—Senninger, Powers, Leavitt and Roedel

[57] ABSTRACT

A kind of automatic rotary weighing and packing machine having a plurality of weighers radially or annularly arranged on a circular rotary table for automatically effecting such processes as filling of product, weighing and judgement at respective positions around the table, which is especially suitable in the case where the product to be packed is sticky granular or powdered bulk material and the packing container is a bag or the like. This machine uses no weigh hopper or bucket in which sticky product is liable to remain to cause weight error, and the packing container is held by a holding mechanism attached to each weigher and directly filled with product, which is then weighed and sealed. A fixed amount feeding device is used for feeding product into the container and its throughput is controlled based upon the result of a subsequent weighment for keeping the weight of product packed in each container always at a predetermined value.

17 Claims, 4 Drawing Sheets

1

DEVICE FOR AUTOMATICALLY FILLING AND PACKING PREDETERMINED WEIGHT OF PRODUCT IN CONTAINERS

BACKGROUND OF INVENTION

This invention relates to an automatic weighing, filling and packing device and, especially, to a rotary weighing, filling and packing machine comprising a rotary table or turret provided with a plurality of weighing heads arranged circularly thereon for automatically and successively effecting such operations as filling, weighing and packing product at respective fixed locations disposed around it.

British Pat. No. 1,013,130 discloses an example of such machine according to the prior art. It includes a turret provided with a plurality of weighing heads each having a weigh hopper or bucket. A plurality of operating locations are disposed along the periphery of the turret and specific operations are applied to each weighing head when it passes these locations. In the cited example, for instance, a predetermined amount of product is fed to the weighing hopper by an automatic feeder at the first location and a container is fed and filled with the product discharged from the weigh hopper at the last location. At the locations between both locations, the product in the weigh hopper is weighed for generating a weight signal and, based upon this weight signal, judgement of acceptability of the packed product and adjustment of the amount of product to be fed are effected.

Although this type of automatic weighing and packing machine is effective when the product is hard and/or has a relatively large grain size and accompanied by no dust, part of product may remain in the weigh hopper to cause an error in the net weight of the packed product when the product is powdered or viscous and, especially, sticky. In order to solve this problem, one may use such a method as weighing product after filling the container. More particularly, consideration has been given to substituting for each weigh hopper a weighing cradle onto which a container may be placed and filled with product, as suggested in the British patent publication No. 2,195,779A. However, this system is undesirable when the container has an unstable shape as in the case of a soft bag.

SUMMARY OF INVENTION

Accordingly, an object of this invention is to provide an improved automatic rotary weighing, filling and packing device which is suitable to handle bag-like containers and can automatically effect not only accurate measurement of the net weight, but also judgement of acceptability of the product and adjustment of the amount of product to be fed.

This object can be attained by the device of this invention, which comprises a rotary table having a plurality of weighing heads arranged circularly thereon and each provided with a weigher which includes a packing container holding mechanism instead of the weigh hopper. A plurality of operating locations are disposed around the rotary table for applying specific operations to each weighing head which has arrived thereat. More particularly, the packing container is fed to and held by the holding mechanism at the first location and the weight of the container is measured and then stored at the second location. The container is filled with a predetermined amount of product from an automatic feeder at the third location and the weight of the filled container is measured and the above-mentioned stored value is subtracted therefrom to obtain net weight which is then compared with a predetermined allowable range to judge its acceptability at the fourth location. The opening of the container is closed at the fifth location and the packed products are sorted and delivered based upon the result of judgement at the sixth location. The above-mentioned automatic feeder is adapted so that its amount of feed can be adjusted automatically based upon the deviation of the net weight from a predetermined target weight.

These and other objects and features of this invention will be more clarified by reading the following description with reference to the accompanying drawings.

DETAILED DESCRIPTION OF EMBODIMENTS

Figure 1:
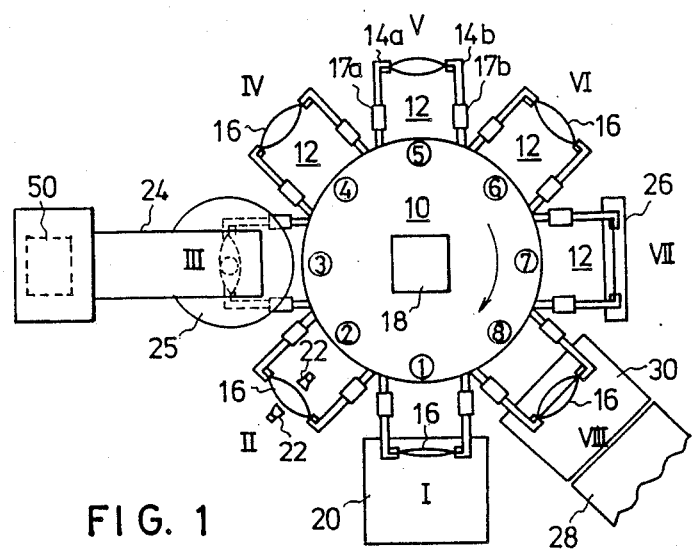
FIG. 1 is a schematic plan view representing an embodiment of the rotary weighing, filling and packing device according to this invention.
Figure 3:
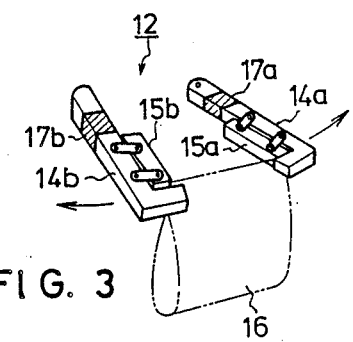
FIG. 3 is a perspective view representing a schematic structure of an inventive container holding mechanism included in the embodiment of FIG. 1.
Figure 2:
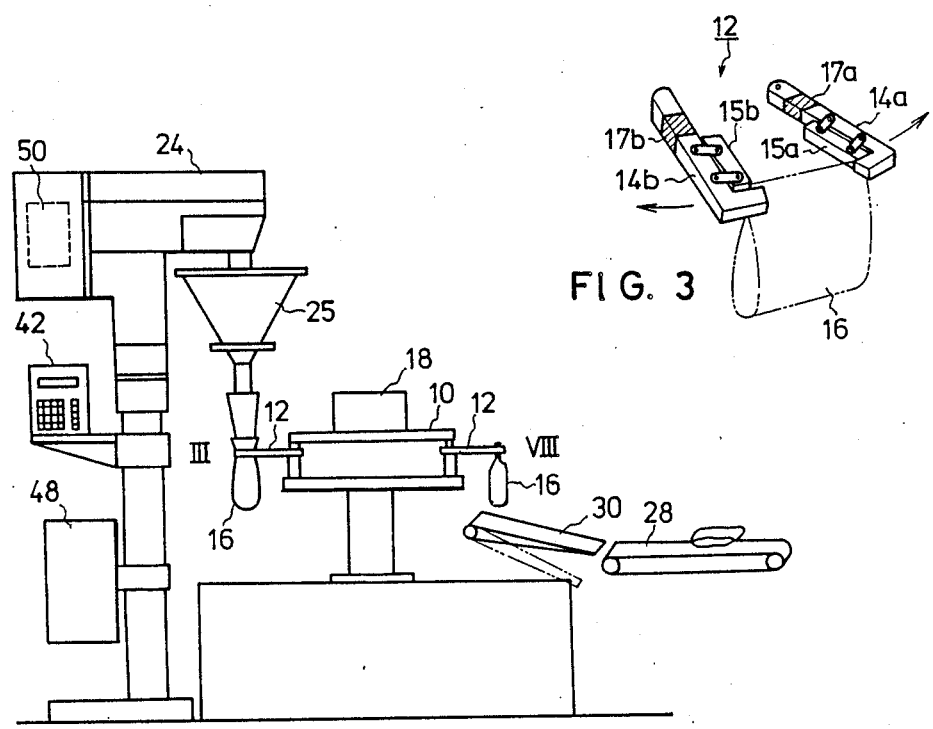
FIG. 2 is a side view of the embodiment of FIG. 1.

Referring to FIGS. 1 and 2, a rotary table 10 which rotates intermittently about a central axis includes eight weighing heads arranged at equal intervals therearound as shown by numerals 1 to 8 enclosed in small circles and each head includes a container holding mechanism 12. As shown in FIG. 3, the holding mechanism 12 includes a pair of holding arms 14a and 14b having catching units or grippers 15a and 15b at their outer ends, which are automatically opened and closed by a suitable actuating device (not shown) to hold a bag-like container 16 as shown in phantom. The holding arms 14a and 14b are also provided with load cells 17a and 17b near their roots (inner ends) for sensing the weight of product held by the catching units 15a and 15b to supply a corresponding weight signal to a control device 18 on the table 10. Eight operating locations or stations are dispersed around the rotary table 10 as shown by Roman numerals I to VIII, and the following operations are applied at these locations to each weighing head revolving thereto.

A packing container feeding device 20 is disposed at operating location I at which the bag-like container 16 is automatically fed to the weighing head arriving thereat and held by the holding mechanism 12. Thus, the load cells 17a and 17b generate a weight signal corresponding to the weight of the container, namely, the tare. When this weight signal becomes stable it is taken into the control device 18 at the next operating location II and stored in a memory location of a built-in memory corresponding to the weighing head, as described hereinafter. A suction device 22 is disposed at location II to open the mouth of the bag-like container after tare storage. A product feeder 24 having a screw feeder 25, for example, is disposed at operating location III, for feeding a predetermined amount of product to each container 16. The product feeder 24 may be of any known type (such as an electromagnetic vibration type or gravity type) suitable to the type of product to be fed. Then, the load cells 17a and 17b generate a weight signal corresponding to the weight of the filled container, and this signal is taken into the control device 18 when it becomes stable at the next operating location IV. At this location a central processing unit (CPU) included in the control device 18 subtracts a previously stored corresponding tare value from this weight signal to calculate a net weight and then compare this net weight with a preset allowable range. When the net weight does not fall within this allowable range, the control device generates a failure signal and stores it in a location of the memory corresponding to the weighing head. In operating locations V and VI, vibration is applied to the holding mechanism 12 to settle the product in the container as occasion demands. In operating location VII, the holding arms 14a and 14b open in the arrow direction of FIG. 3 to close the opening of the container 16, and the opening is then sealed by a suitable sealing device 26. The product thus packed is released from the holding mechanism 12 at the last operating location VIII and delivered through a chute 30 to a transporting device such as belt conveyor 28. The chute 30 is adapted to move as shown in phantom in FIG. 2 in response to the failure signal in the corresponding memory location for removing the corresponding product as rejected. The above-mentioned operations are repeated sequentially for each weighing head and acceptable products are delivered successively by the conveyor 28 at operating location VIII.

Figure 4:
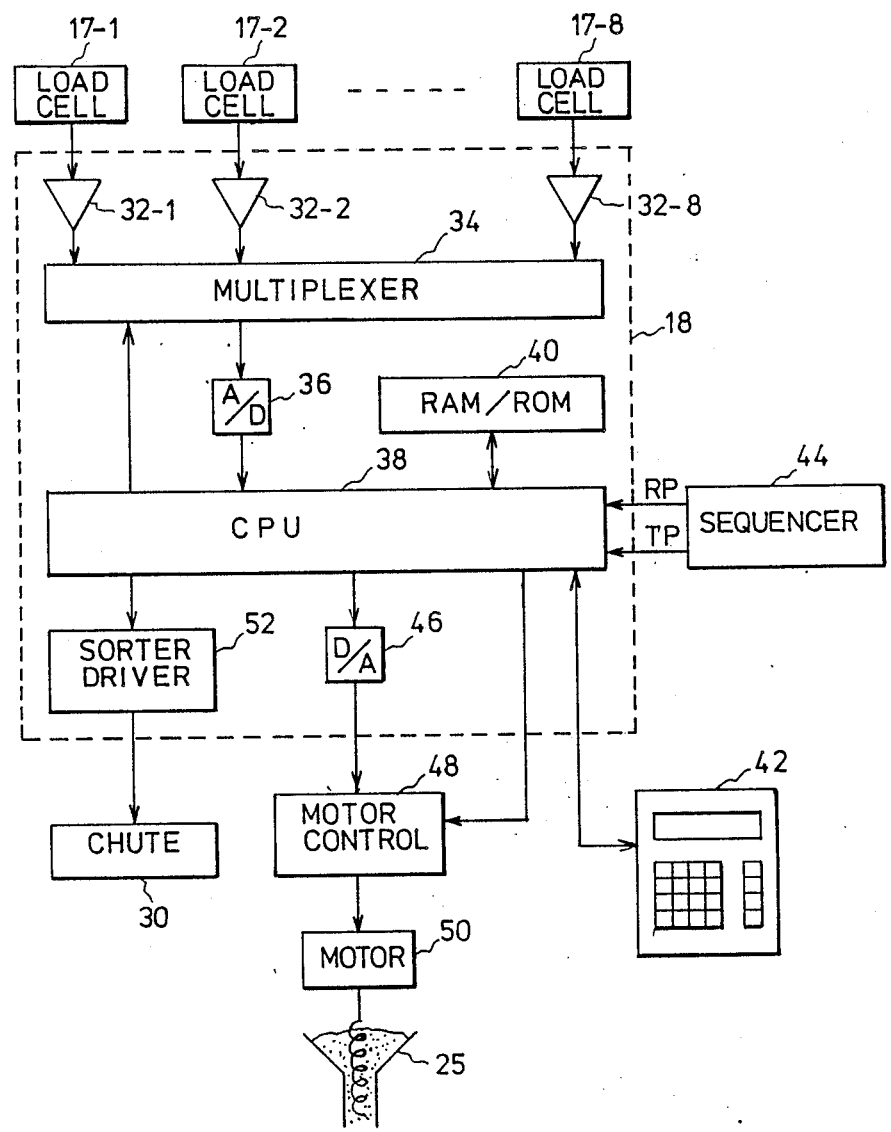
FIG. 4 is an electric circuit diagram representing a configuration of control system of the embodiment of FIG. 1.

As shown in FIG. 4, the weight signals generated by the eight load cells 17-1, 17-2, . . . 17-8 (each consisting of the above-mentioned pair of halves 17a and 17b) are respectively amplified by amplifiers 32-1, 32-2, . . . 32-8 included in the control device 18 and sequentially supplied through an analog-to-digital (A/D) convertor 36 to a central processing unit (CPU) 38 by a multiplexer 34 in time-division fashion. The CPU 38 operates based upon an operation program preset in a read-only memory (ROM) in an incorporated memory device 40, a weight condition supplied from a keyboard input device 42 and below-mentioned pulse signals from an external sequencer 44, to execute calculation of the net weight of the product of each weighing head and judgement of its acceptability and to write the result thereof in the corresponding memory location of a random-access memory (RAM) of the memory device 40, as described above. The calculated value is supplied through a digital-to-analog (D/A) convertor 46 to a motor control device 48 which controls a motor 50 for driving the screw feeder 25 of the product feeder 24 based upon this value, thereby adjusting the amount of product fed to the container 16 at operating location III. The control device 48 also stops the feed of product in response to a stop signal from the CPU 38 as described above. The CPU 38 also reads the result of judgement from the memory location of RAM corresponding to the weighing head arriving at operating location VIII and supplies it to a sorter driving device 52 which moves the chute 30 to remove the corresponding product to be rejected.

Figure 5:
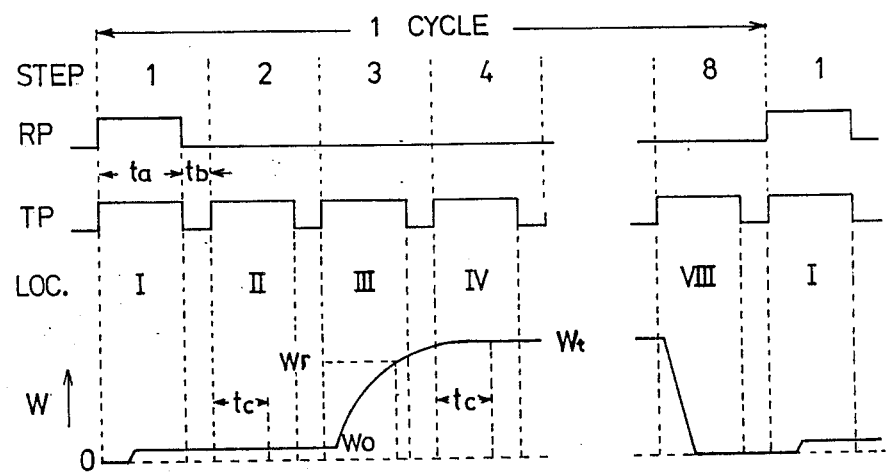
FIG. 5 is a timing diagram representing the time relationship of respective operations applied to each weighing head of the embodiment of FIG. 1.

While the intermittent rotation of the rotary table 10 is controlled by a program of the above-mentioned sequencer 44, the sequencer 44 generates an origin recognition pulse signal RP and a timing pulse signal TP as shown in FIG. 5 in synchronism with this rotational motion. The pulse RP occurs every rotation of the rotary table 10, that is, every cycle of operation and, in this embodiment, it occurs when the first weighing head 1 coincides with the first operating location I as shown in FIG. 1. Thus, each operating cycle is initiated at this position as the origin and CPU 38 is responsive to this signal to recognize it. The timing pulse TP occurs every intermittent motion of the rotary table 10 and, in this embodiment, it occurs eight times every cycle. This pulse TP has a pulse width $t_a$ equal to the stationary time of the rotary table 10 and a pulse interval $t_b$ equal to the transit time thereof. One cycle of operation is divided into eight steps 1 to 8 as shown by the pulses TP, and CPU 38 is adapted to count this pulse by a built-in counter for recognizing the relationship between the steps of operation and the respective weighing heads as shown in the lower half of FIG. 5.

Considering now the first weighing head 1 existing at the first operating location I in the first step of operation, a container is fed and held by the holding mechanism 12 of this head at this location as described above. Therefore, the weight signal W of the load cell 17-1 of this weighing head increases as shown and then becomes stable at location II in the next step to indicate the weight of the container, that is, the tare value $W_O$. CPU 38 is adapted to write the sufficiently stable tare value $W_O$ in the memory device 40 after a predetermined stationary time $t_c$ of the table 10 as shown. The weight signal W increased abruptly in the third step or at location III since the container is filled with product. CPU 38 compares this signal W with a reference value $W_r$ preset in the memory device 40 and, when coincidence is obtained therebetween, supplies of a stop signal to the motor control device 48 to stop the feed of the product. The reference value $W_r$ is selected so that the signal W further increases by over-feed and reaches a target value $W_t$ after stopping the feed. The signal W is read by CPU 38 in the fourth step at location IV when it becomes sufficiently stable after the predetermined stationary time $t_c$ of the table 10 as described above, and the tare value $W_O$ in the memory device 40 is subtracted therefrom to calculate the net weight. Acceptability of this net weight is then judged based upon the predetermined allowable range as described above and a sorting operation is effected based upon the result of judgement at the last eighth step. If necessary, deviation of the calculated net weight from a predetermined value may be calculated for adjusting the above-mentioned reference value $W_r$ based thereupon. This deviation signal may be applied to the motor control device 48 for controlling the amount of feed. These calculating and adjusting operations are completed enough within the time interval of the fourth step and this enables complete correction of the amount of feed to the next (eighth) head. The above-mentioned operations area applied to each weighing head with sequential shift by one step as shown in FIG. 5.

As described above, the weight signal W is read by CPU 38 only at the operating locations II, III and IV. Therefore, it is unnecessary for the multiplexer 34 to pass the weight signals from all weighing heads in each step and it is enough to apply the time division operation selectively to those from only three weighing heads which are underlined in FIG. 5. Accordingly, the switching pulses for the multiplexer 34 may be selected so as to fit thereto.

Figure 6:
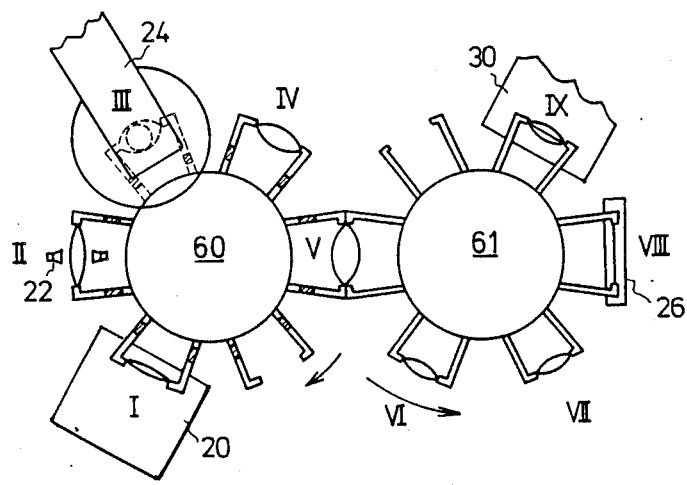
FIG. 6 is a schematic plan view representing another embodiment of the rotary weighing, filling and packing device according to this invention.

The second embodiment of this invention shown in FIG. 6 includes a first rotary table 60 having six weighing heads around it and a second rotary table 61 having six holding heads around it. While each weighing head of the first rotary table 60 includes a holding mechanism having a load cell as same as the weighing head of FIG. 1, each holding head of the second rotary table 61 includes a holding mechanism having no load cell. As shown in the drawing, nine operating locations I to IX are disposed around the first and second rotary tables and location V is common to both tables. These tables are adapted to rotate synchronously at the same speed so that the heads of both tables get together at operating location V (that is, the heads of both tables share location or station V). Container supply, tare measurement, filling and weighing are effected respectively at operating locations I, II, III and IV as in the embodiment of FIG. 1 and the filled container is handed over at location V (which may thus be referred to as a transfer station) from the holding mechanism of the weighing head to the holding mechanism of the holding head. The product is settled by the aid of vibration at operating locations VI and VII as in location V and VI of the embodiment of FIG. 1 and sealing and delivery of the package are effected respectively at locations VIII and IX as locations VII and VIII of the embodiment of FIG. 1. Although such operations as processing of weight data and adjustment of the amount of feed are completely the same as those of the embodiment of FIG. 1, this embodiment has an advantage in that the weighing operation is hardly affected by the vibration at locations VI and VII since the operations after weighment have been transferred to the second table.

Figure 7:
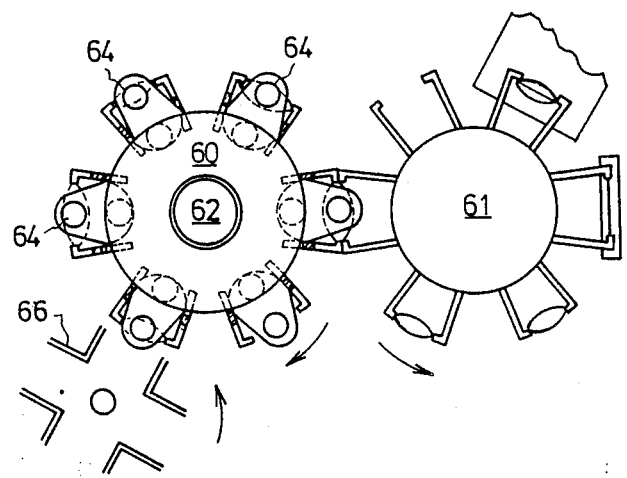
FIG. 7 is a schematic plan view representing a further embodiment of the rotary weighing, filling and packing device according to this invention.

While the third embodiment shown in FIG. 7 includes two rotary tables 60 and 61 having six weighing heads and six holding heads, respectively, the same as the embodiment of FIG. 6, a product feeder 62 is carried on the first rotary table 60 so as to rotate therewith. Each weighing head includes a filling nozzle 64 connected to the product feeder 62 and the nozzle is opened and closed by an automatically controlled valve (not shown) at operating location III to supply a predetermined amount of product into the underlying bag-like container. Although the containers are supplied by an automatic rotary feeding device 66 at operating location I in the embodiment as shown, the other operations are completely the same as those of the embodiment of FIG. 6. However, it is possible in this embodiment to effect the product filling operation across one or both of operating locations II and IV as occasion demands, thereby improving the operational speed.

While the invention has been described in detail above in connection with the three embodiments, this description is for illustrative purposes only and is not intended to limit the scope of this invention. It will be understood that various modifications and changes can be made thereon without departing from the scope of the invention as defined in the appended claims.

We claim:

1. A device for automatically filling and packing a predetermined weight of product in containers, comprising a first rotary table including a plurality of weighing heads arranged at equal intervals around said table, each weighing head including weight detecting elements and a bag-like container holding mechanism, and a plurality of operating means disposed at first to sixth operating locations arranged in this order around said first rotary table for applying specific treatments to each weighing heads passing said locations; characterized by said operating means comprising:

container feeding means for feeding a bag-like container to said holding mechanism to be held thereby when each of said weighing heads arrives at said first operating location, memory means for reading and storing the weight of said container detected by said weight detecting elements when each weighing head arrives at said second operating location, product feeding means for filling said container with a predetermined target weight of product when each weighing head arrives at said third operating location, arithmetic means for subtracting the stored weight of said container from the weight of the filled container detected by said weight detecting elements to calculate the net weight of said product for comparing said net weight with a predetermined allowable range to judge the acceptability thereof and for storing the result of judgement when each weighing head arrives at said fourth operating location, feed control means for adjusting the amount of feed of said product feeding means based upon the deviation of said net weight from said target weight while each weighing head is at said fourth operating location, sealing means for sealing the opening of said container to complete a packed product when each weighing head arrives at said fifth operating location, and delivery means for discharging said packed product from said holding mechanism and, if not acceptable, removing said product based upon said stored result of judgement when each said weighing head arrives at said sixth operating location.

2. A device as set forth in claim 1, characterized by a second rotary table provided with a plurality of holding heads arranged at equal intervals around said table and adapted to rotate in synchronism with said first rotary table, whereby each holding head gets together with each weighing head of said first rotary table, each holding head including a bag-like container holding mechanism, transfer means for transferring said container from the weighing head to the holding head when said weighing head gets together with said holding head, at least said first to fourth operating locations being arranged around said first rotary table, and the other operating locations being arranged around said second rotary table.

3. A device as set forth in claim 1 or 2, characterized in that said product feeding means is disposed on said first rotary table, thereby enabling said filling operation to be effected during revolution of said weighing heads.

4. A device as set forth in claim 1 or 2, characterized in that said operating means further comprises vibrating means for applying vibration to said filled container to settle the product between said fourth and fifth operating locations.

5. A device as set forth in claim 3, characterized in that said operating means further comprises vibrating means for applying vibration to said filled container to settle the product between said fourth and fifth operating locations.

6. A device as set forth in claim 1 or 2, characterized in that the container holding mechanism of each said weighing head includes a pair of holding arms which can move toward and away from each other, each of said holding arms having a container catching unit adjacent one end thereof and said weight detecting element adjacent the opposite end thereof, whereby said bag-like container fed thereto is caught and hung at both ends of the opening thereof to enable detection of the weight thereof.

7. A device as set forth in claim 3, characterized in that the container holding mechanism of each said weighing head includes a pair of holding arms which can move toward and away from each other, each of said holding arms having a container catching unit adjacent one end thereof and said weight detecting element adjacent the opposite end thereof, whereby said bag-like container fed thereto is caught and hung at both ends of the opening thereof to enable detection of the weight thereof.

8. A device as set forth in claim 4, characterized in that the container holding mechanism of each said weighing head includes a pair of holding arms which can move toward and away from each other, each of said holding arms having a container catching unit adjacent one end thereof and said weight detecting element adjacent the opposite end thereof, whereby said bag-like container fed thereto is caught and hung at both ends of the opening thereof to enable detection of the weight thereof.

9. A device for filling bag-like containers with a predetermined amount of product, said device comprising rotary table means, a plurality of heads arranged at spaced intervals around said rotary table means, each head comprising holding means for holding a bag-like container and at least some heads of said plurality of heads further comprising weighing means for detecting the weight of said bag-like container and its contents, and a plurality of operating means disposed at stations arranged around said rotary table means for performing a plurality of sequential operations in connection with each bag-like container held by said holding means as said rotary table means rotates to move the bag-like container in sequence from one station to the next, said plurality of operating means comprising, in sequence;

container feeding means for feeding a bag-like container to a head having both said holding means and said weighing means, whereupon said holding means is operable to hold said bag-like container, means for reading and storing the weight of said bag-like container as detected by said weighing means, product feeding means for loading a predetermined amount of product into said bag-like container through an open mouth of the container, arithmetic means for judging whether the combined weight of said bag-like container and product therein falls within an acceptable range of weight, sealing means for sealingly closing the mouth of the bag-like container, said holding means thereafter being adapted to release said container, and delivery means for delivery of a released container to a first destination if the container and product therein falls within said acceptable weight range and to a second destination if the container and product therein falls outside of said acceptable weight range.

10. A device as set forth in claim 9 wherein said rotary table means comprises a single rotary table with heads arranged at intervals around the table, each head having both said holding means and said weighing means.

11. A device as set forth in claim 10 wherein said container feeding means, means for reading and storing the weight of said bag-like container, product feeding means, arithmetic means, sealing means, and delivery means are located at separate stations around said rotary table.

12. A device as set forth in claim 9 wherein said rotary table means comprises a first table having a plurality of heads spaced at intervals therearound, each head on the first table having both said holding means and said weighing means, and a second rotary table having a plurality of heads spaced at intervals therearound, each head on the second table having said holding means but not said weighing means, said tables being rotatable in synchronism whereby the weighing heads of the first table are adapted to hold bag-like containers for operation by said container feeding means, said means for reading and storing the weight of said bag-like container, said product feeding means and said arithmetic means, and the weighing heads of the second table are adapted to hold bag-like containers for operation by said sealing means and said delivery means.

13. A device as set forth in claim 12 wherein said first and second rotary tables share a transfer station at which a bag-like container held by said holding means of a head on the first table is adapted to be transferred to said holding means of a head on the second table.

14. A device as set forth in claim 13 wherein said first and second tables are rotatable in opposite directions.

15. A device as set forth in claim 13 wherein said product feeding means is mounted on said first rotary table, and each head on the first table has means associated therewith for delivery of product from said product feeding means to a bag-like container held by said holding means of the head.

16. A device as set forth in claim 9 wherein said holding means comprises grippers for gripping the bag-like container adjacent the mouth of the bag, said grippers being movable away from one another for closing the mouth of the bag prior to sealing the mouth of the bag closed.

17. A device as set forth in claim 16 wherein said holding means comprises a pair of arms having inner and outer ends, said grippers being located generally adjacent the outer ends of the arms and said weighing means comprising weight detecting elements located generally adjacent the inner ends of the arms.

* * * * *

UNITED STATES PATENT AND TRADEMARK OFFICE
CERTIFICATE OF CORRECTION

PATENT NO. : 4,928,473

DATED : May 29, 1990

INVENTOR(S) : Takeyoshi Nagao and Toru Kohashi

It is certified that error appears in the above-identified patent and that said Letters Patent is hereby corrected as shown below:

Column 4, line 36, "increased", should read ---increases---.

Column 4, line 62, "operations area", should read ---operations are---.

Column 7, lines 60-62, "the combined weight of said bag-like container and product therein", should read ---the weight of the product in said bag-like container---.

Column 8, lines 5-9, "the container and product therein falls within said acceptable weight range and to a second destination if the container and product therein falls outside of said accepatable weight range" should read ---the weight of product in the container falls within said acceptable weight range and to a second destination if the weight of product in the container falls outside of said acceptable weight range---.

Signed and Sealed this

Seventeenth Day of September, 1991

Attest:

HARRY F. MANBECK, JR.

Attesting Officer

Commissioner of Patents and Trademarks